(No Model.) 3 Sheets—Sheet 2.
W. AAB.
ROTARY ENGINE.
No. 598,619. Patented Feb. 8, 1898.
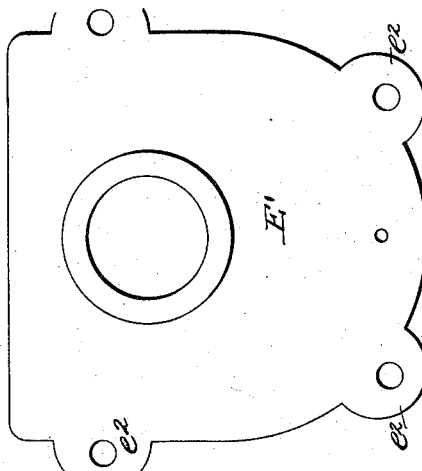
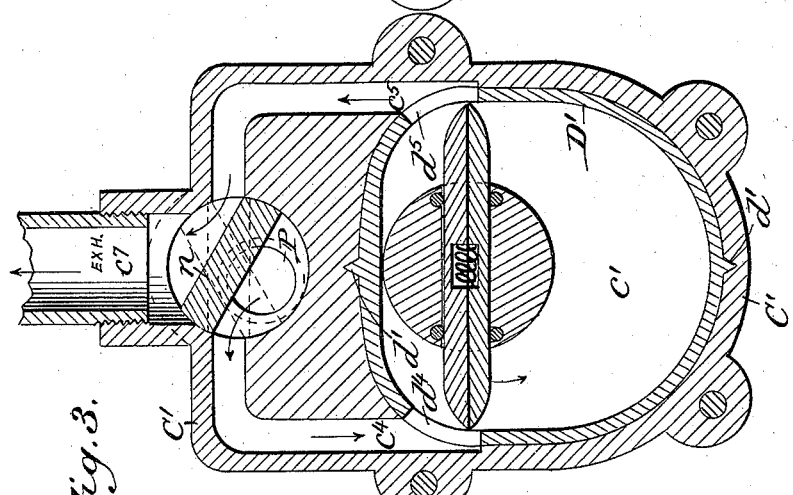
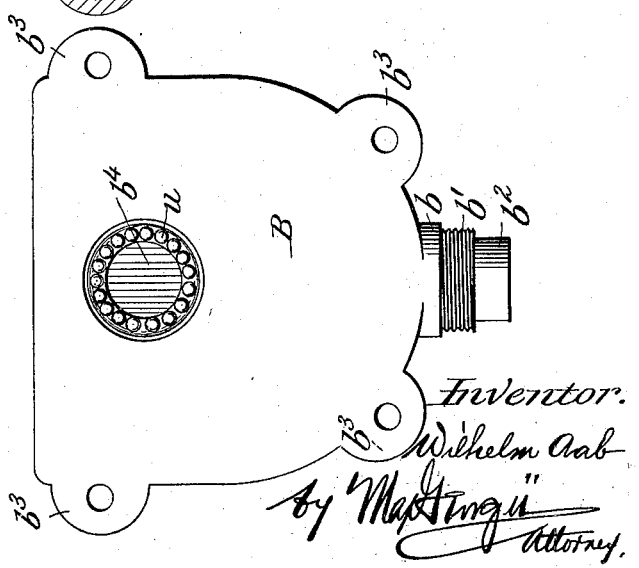
Attest:
F. H. Schott
M. C. Massie
Inventor.
Wilhelm Aab
by Max Tingü
Attorney.

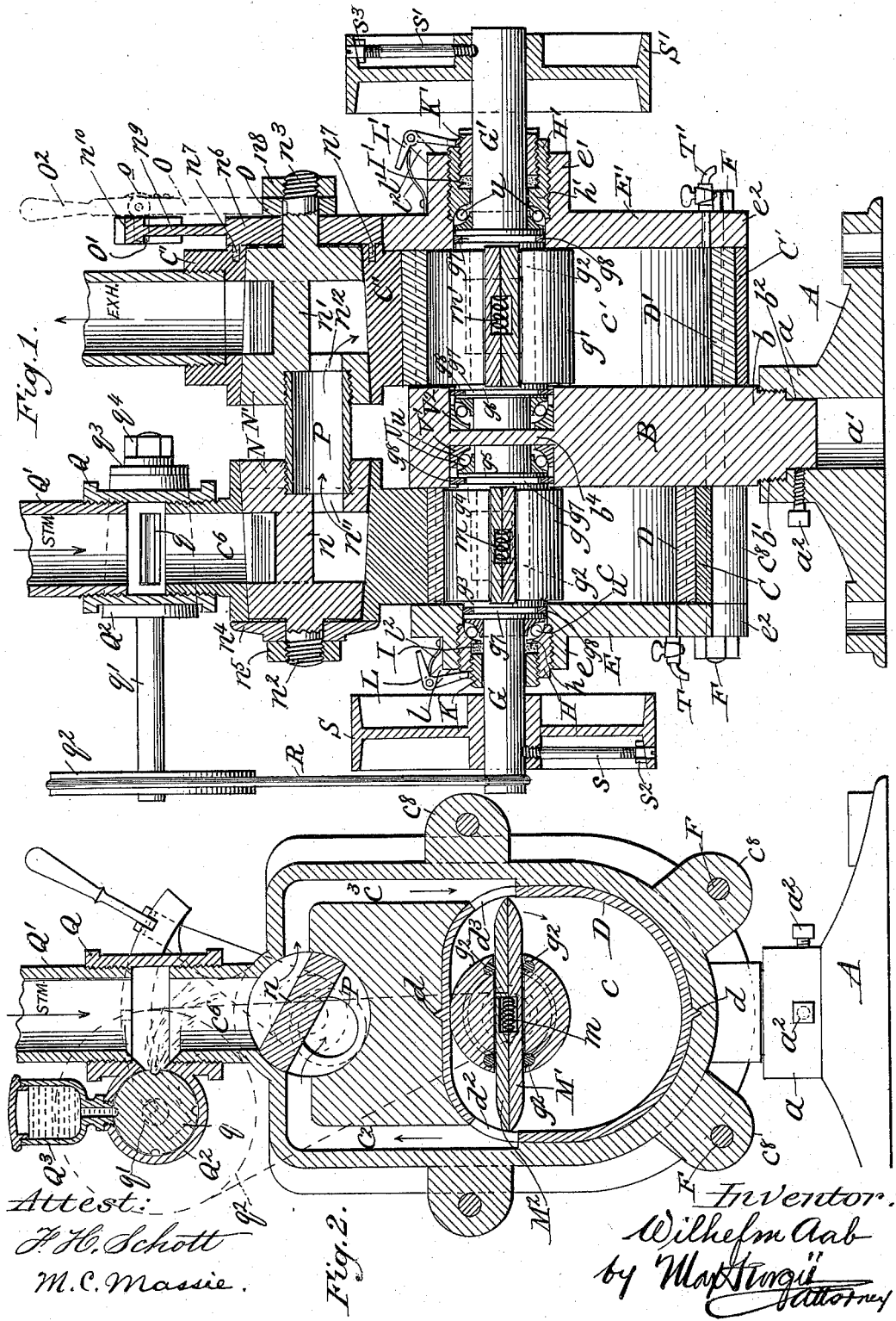

(No Model.) 3 Sheets—Sheet 3.
W. AAB.
ROTARY ENGINE.
No. 598,619. Patented Feb. 8, 1898.
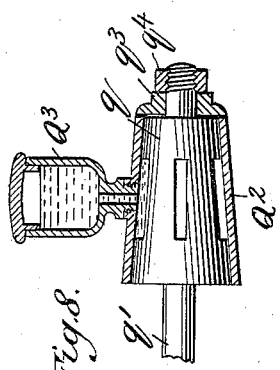
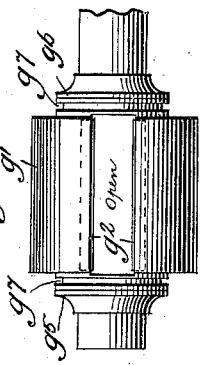
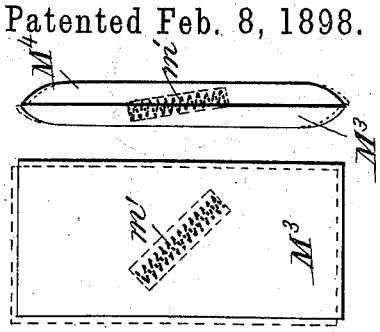
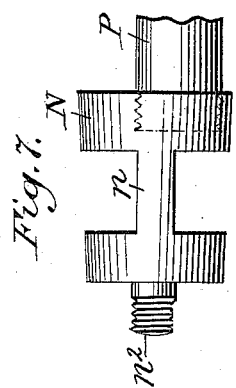
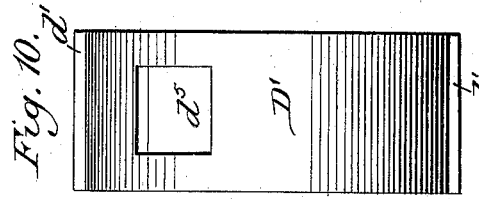
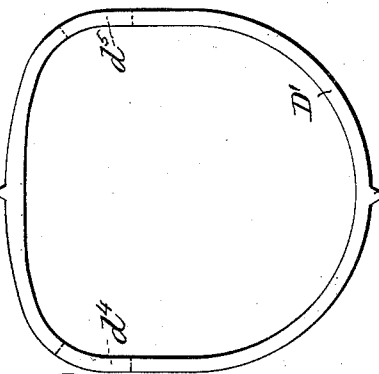
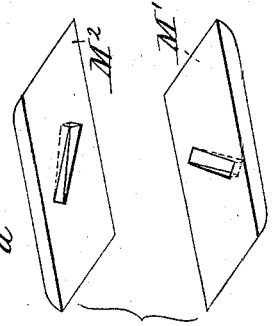
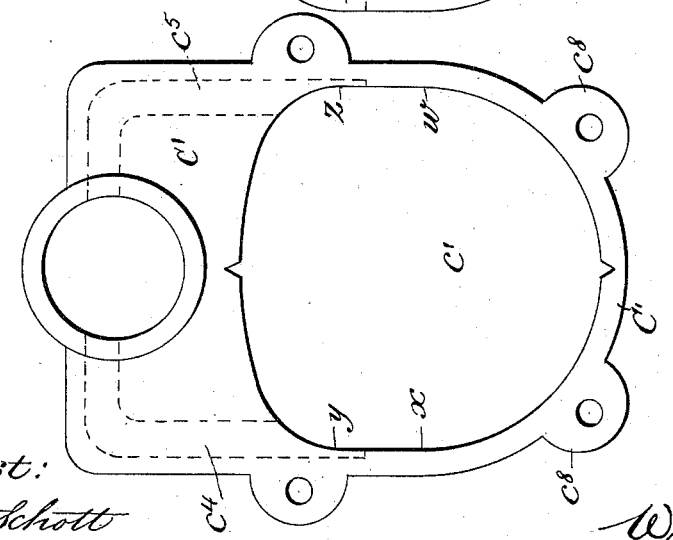
Attest:
F. H. Schott
M. C. Massie.
Inventor:
Wilhelm Aab
by Marstwigü
Attorney.
THE NORRIS PETERS CO., PHOTO-LITHO., WASHINGTON, D. C.

UNITED STATES PATENT OFFICE.

WILHELM AAB, OF NEW ULM, MINNESOTA.

ROTARY ENGINE.

SPECIFICATION forming part of Letters Patent No. 598,619, dated February 8, 1898.

Application filed February 12, 1897. Serial No. 623,051. (No model.)

*To all whom it may concern:*

Be it known that I, WILHELM AAB, a citizen of the German Empire, residing at New Ulm, in the county of Brown and State of Minnesota, have invented certain new and useful Improvements in Rotary Engines; and I do hereby declare the following to be a full, clear, and exact description of the invention, such as will enable others skilled in the art to which it appertains to make and use the same.

My invention relates to an improvement in rotary engines, and particularly to a compound rotary engine.

The main object of my invention is to produce a rotary engine in which the steam after acting on one rotary piston can then be used at a lower pressure to operate another rotary piston.

With this object in view and some others which will be obvious to those skilled in the art my invention consists in the features, details of construction, and combinations of parts, which will first be described in connection with the accompanying drawings and then particularly pointed out in the claims.

In the drawings, Figure 1 is a longitudinal section, partly in elevation, of a compound rotary engine embodying my invention; Fig. 2, a transverse section through the high-pressure cylinder; Fig. 3, a detail transverse section through the low-pressure cylinder; Fig. 4, a front elevation of the partition and support; Fig. 5, a detail view of one cylinder-head; and Figs. 6 to 13, inclusive, detail views to be referred to hereinafter.

Referring to the drawings, A is a bed-plate provided with the usual bolt-holes and having a central boss $a$, which is provided with a central vertical bore or opening $a'$, enlarged at its upper end, the said enlarged portion being screw-threaded. Just below the enlarged portion the boss is provided with two set-screws $a^2$, arranged transversely to the boss and at ninety degrees apart.

To the base-plate A is secured a central partition B, which also forms a support for the engine, this partition having a downward-projecting end $b$, whose diameter is reduced at two places $b'$ and $b^2$, the part $b'$ being screw-threaded to engage the internal screw-threads in the enlarged open end of the boss $a$, while the part $b^2$ is arranged to fit snugly into the bore $a'$ below the threaded portion, said part $b^2$ being engaged by the ends of the set-screw $a^2$ when the latter are tightened, whereby the central portion B is fixed rigidly to the base-plate A. The central partition B is provided with ears or lugs $b^3$, having bolt-holes, and also has two oppositely-located circular recesses near the upper end which are separated from each other by a narrow wall or diaphragm $b^4$, Fig. 1, these recesses being arranged to contain ball-bearings, as will be fully described hereinafter.

To the central partition B is secured a pair of shells or casings C C', one on each side, each of which has a piston opening or chamber $c\ c'$, Figs. 1, 2, and 3, the chamber on the low-pressure side of the engine being larger than that on the high-pressure side. These chambers are not circular in cross-section, but have the forms shown in Fig. 3 and 6, respectively, the lower half of the cross-section being semicircular, as shown by the curved line from $w$ to $x$, while the upper portion from $y$ to $z$ is substantially a semi-ellipse, the upper and lower curves being connected by substantially straight lines, as shown from $x$ to $y$ and $z$ to $w$, these straight portions being in the present instance tangent to the lower curved portion.

At the upper end of each shell C C' is a conical valve-chamber, from each of which extend two ports or passages $c^2\ c^3\ c^4\ c^5$, while the valve-chambers also communicate with an inlet $c^6$ and an outlet $c^7$, respectively. Each shell is also provided with a series of lugs $c^8$, for a purpose hereinafter described.

On the inside of each shell is placed a lining-ring D D', which is intended to be of metal suitable for enduring the wear of the pistons. These lining-rings D D' are each provided with an upward and a downward projecting ridge $d\ d'$, which ridges enter corresponding notches formed in the shells, whereby the insertion of the lining-rings D D' into their corresponding chambers is rendered easier, as the ridges and notches form guides for the insertion of the lining-rings, while at the same time they serve to overcome any tendency of the said lining-rings to rotate within their respective chambers, as they would otherwise be liable to do from the friction of the pistons if the said rings did not fit very closely into the shells or casings C C'. Each lining-ring is of substantially equal thickness at all points, so that its interior has a curved cross-section substantially similar to the cross-section of its chamber which has already been described. However, so long as the interior of the rings have the said described cross-sections it is not absolutely necessary that their exteriors or the interiors of the chambers should be parallel thereto, though for convenience in manufacture this is preferable.

Each lining-ring is provided with a pair of openings $d^2$ $d^3$ $d^4$ $d^5$, which are arranged to register with the respective parts $c^2$ $c^3$ $c^4$ $c^5$, above referred to.

At the outside of each shell C C' is placed a cover or lid E E', each lid being provided with an outward-extending nave $e$ $e'$, screw-threaded internally, as shown in Fig. 1. The covers E E' are provided with lugs $e^2$, in which are formed bolt-holes. The shells C C' are held to the partition B, and the covers E E' are held to the said shells by means of bolts F, passing through the bolt-holes in the corresponding lugs $b^3$, $c^8$, and $e^2$, whereby the said parts are clamped together steam-tight, suitable gaskets of rubber or other material being inserted, if necessary, to make steam-tight joints.

Extending in each direction longitudinally from the central diaphragm $b^4$ are two shafts G G', which extend outward through the naves $e$ $e'$. Each shaft is provided with ball-bearings at each end, as shown in Fig. 1, and is packed at its outer end, where it extends through its respective nave, in the following manner: Within each nave is screwed a bushing H H', provided with a centrally-projecting annular lip $h$ $h'$, arranged in close contact with its respective shaft. These bushings are each threaded internally and arranged to receive a packing-ring I I', which is compressed against its corresponding lip H H' by a follower K K', surrounding the shaft and threaded into the respective bushing. To prevent the unscrewing of the followers, each is provided with a longitudinal notch in its periphery engaged by the lower end of a bell-crank L L', pivoted in a bracket $l$ $l'$, secured to the respective lid E E', one arm of the bell-crank being normally pressed upward by a spring $l^2$, secured to the respective nave $e$ $e'$. On that portion of each shaft within the respective chamber $c$ $c'$ is formed an enlargement $g$ $g'$, slotted diametrically and provided at each side of its slot with antifriction-rollers $g^2$. Passing through each slot and movable over the said antifriction-rollers is located a piston, each piston comprising two parts M' M² M³ M⁴. These two parts are movable longitudinally with relation to each other, and are normally forced in opposite directions by means of springs $m$ $m'$, located in recesses formed in the inner faces of the contacting parts of each piston, these recesses being formed one-half in each of said piston parts and arranged at an angle both to the edges and to the inner faces of the piston, as will be clear from Figs. 12 and 13. The outer corners at each end of each piston part are rounded off, as shown.

In each valve-chamber is located a conical valve N N', each having a transverse partition $n$ $n'$ and outward-extending studs $n^2$ $n^3$, that on the low-pressure side of the engine being somewhat longer than the other. The stud $n^2$ on the high-pressure side of the engine passes through a hole in a cap $n^4$, fitting steam-tight over the outer end of its respective valve-chamber, yet capable of rotation against its shell C. The stud $n^2$ is screw-threaded at its extreme outer end and is provided with a nut $n^5$, whereby the conical valve may be adjusted to fit snugly in its valve-chamber. On the low-pressure side of the engine the outer end of the valve-chamber is closed by a plate $n^6$, provided with tongues $n^7$, projecting into grooves formed in the outer face of the shell C', the stud $n^3$ projecting through an opening in the said plate $n^6$ and also through the lower end of a hand-lever O, which is secured to the stud in any suitable manner, as by splining. Outside the lever the stud $n^3$ is provided with a nut $n^8$ for the purpose of drawing its conical valve N' tightly into its chamber.

The plate $n^6$ is provided with an upward-projecting arm $n^9$, which carries a slotted segment $n^{10}$, engaged by a pawl O', formed at right angles to a handle O², pivoted in the forked upper end of the lever O, said pawl O' being normally pressed toward the slotted segment by a spring $o$, secured to the lever O and pressing against the handle O².

The valves N N' are connected to each other by a nipple P, each valve being provided with a passage-way or opening $n^{11}$ $n^{12}$ at the end of said nipple. It is to be noted that the partitions $n$ $n'$ in the valves slope in the same direction—that is to say, they lie in approximately the same plane.

The outlet $c^7$ on the exhaust side of the engine is connected to the exhaust-pipe in the usual manner. The inlet $c^6$ is connected by a coupling Q to the steam-supply pipe Q'. At one side of the said coupling Q is formed a casing Q², within which revolves a conical plug $q$, having a series of longitudinal recesses formed in its periphery. The plug is mounted on a shaft $q'$, provided at one end with a pulley $q^2$, driven from the shaft G by a belt R. The other end of the shaft $q'$ passes through the washer $q^3$ and is provided with a nut $q^4$ for drawing up the plug, so that it will fit snugly within the corresponding conical chamber in the casing Q². To the upper part of the said casing Q² is attached an oil-cup Q³ of any desired construction.

On each shaft G G' is secured any desired means for transmitting power—such, for instance, as the pulley S S', each pulley being held to its shaft by a long screw $s$ $s'$, passing through a hole in the face of its pulley and threaded through a hole in the hub of such pulley. The outer end of each screw $s\ s'$ is slotted, so that it can be turned by a screwdriver in order to screw it tightly against its respective shaft and thereby fix the pulley to such shaft. In order to prevent the backing out of the screws, each is provided with a screw-thread and a nut $s^2\ s^3$ near its outer end, but inside the wheel-rim, each nut being adapted to be screwed into close contact with the inner face of its respective wheel-rim.

Cylinder-cocks T T' are provided for draining off any water of condensation.

In order to prevent or at least to hinder the entrance of the steam to the ball-bearings, each shaft is provided with collars $g^3\ g^4\ g^5\ g^6$, arranged one on each side of the enlargements $g\ g'$, which collars are provided with grooves, as shown at $g^7$, Fig. 11, into each of which grooves is inserted an expansible metal ring $g^8$, which in expanding fits tightly into the opening in which it is located.

The ball-bearings are of any desired construction, those illustrated each comprising a collar U, secured to the shaft and having a sloping and curved ball channel or pathway, against which the balls $u$ contact, the said balls also bearing against corresponding channels or pathways which are formed at the inner ends of the shafts G G' on rings V' V², secured in the respective recesses, and at the outer ends of the shafts on the inner ends or faces of the bushings H H', as will be fully understood from Fig. 1.

The operation of the mechanism above described is as follows: Steam enters the high-pressure side of the engine by way of the steam-supply pipe Q', being deflected by the valve-diaphragm $n$ into the port $c^3$, escaping from the same by way of the opening $a^3$. The enlargement $g$ fitting in close contact with the upper portion of the lining-ring D, the steam acts upon one end only of the piston M' M², causing said piston to rotate in the direction of the arrow, Fig. 2, whereby the shaft G is rotated also. As the piston rotates it is compelled to move longitudinally also, by reason of the fact that its axis of rotation is eccentric to the chamber $c$. By this longitudinal movement of the piston that end of the latter which is fully exposed to the incoming steam is gradually increased until the piston arrives in a position substantially vertical, after which the portion of the piston acted upon by the steam is gradually reduced. Shortly after the piston has passed its vertical position the upper end passes the opening $a^3$, cutting off the steam from action upon the other end of the piston and itself receiving the full steam-pressure, thereby continuing the rotation. As the piston ends become worn by friction against the lining-ring the two parts M' M² of which the piston is formed are forced longitudinally in opposite directions, so that one end of one part is kept in contact with one side of the chamber, while the opposite end of the other part is kept in contact with the other side of the chamber. Moreover, by the angular or diagonal arrangement of the means employed for forcing the parts away from each other said parts M' and M² also tend to separate laterally as well as longitudinally, whereby the one side of one piston part runs in close contact with the inner face of the partition B, while the other side of the other piston part runs in close contact with the inner face of the cover E. By this construction all leakage of steam around the sides or ends of the piston is prevented and the wear of the piston and lining-ring is compensated for. When the said ring has become worn to a considerable extent, it can readily be replaced.

While I have shown and described the enlargement $g$ as in close contact with the upper part of the lining-ring, this is not absolutely necessary, since the momentum of the engine when in motion will cause it to move past the horizontal position, (in which position both ends project equally,) after which the end directly exposed to the incoming steam offers a greater area than that exposed to the action of such steam as leaks between the enlargement $g$ and the upper portion of the lining-ring D. After the steam has forced the piston around so that it reaches a horizontal position the exhaust takes place through the passage $c^2$, past the space beneath the valve-diaphragm $n$, and across through the nipple P into the space beneath the valve-diaphragm $n'$, from whence it enters by way of passage or port $c^4$ and opening $d^4$ into the low-pressure chamber $c'$, rotating the piston M³ M⁴ and the shaft G' in a direction opposite to that of the piston M' M² and shaft G, finally exhausting through the passage $c^5$ over the valve-diaphragm $n'$ and thence outward from the engine. By moving the handle $o^2$ outward against the spring $o$ the pawl $o'$ is thrown out of engagement with the slotted segment $n^{10}$ and the lever O may then be moved, whereby the valves N and N' are rotated about their axis and the diaphragms $n\ n'$, which have considerable thickness, may be brought into a position for contracting the inlet and exhaust passages for the steam or for entirely reversing the direction of travel of the steam, whereby the respective directions of rotation of the pistons and shafts are also reversed. When the engine is in motion, the conical plug $q$ is also rotated, whereby its various recesses are brought, one after the other, beneath and are filled by oil from the lubricator Q³. The continued rotation of the plug $q$ brings these recesses one by one to a position where they can discharge their contents into the steam-inlet $c^6$, where the oil or other lubricant is sprayed by the action of the incoming steam and blown into the piston-chambers with said steam, thereby lubricating the pistons and the inner surfaces of the lining-rings in a positive and efficient manner and without waste of lubricant.

The rate of feed of the oil may be determined by the rate of speed of the coned plug, which speed can be altered to suit exigencies by changing the pulley $q^2$. Moreover, it is to be noted that the supply of lubricant is in proportion to the demand for it, since the more rapid the rotation of the pistons the greater the rotation of the movable delivering device $q$, and hence also the greater the supply of oil to the steam-inlet.

Having thus fully described my invention, what I claim as new, and desire to secure by Letters Patent, is—

1. In a rotary engine, the combination with a piston divided longitudinally in a plane, parallel to the faces of the piston to form two parts, each part being provided on its inner face with a recess which is deeper at one end than at the other, each recess lying at an angle to the sides of the piston and both recesses being in register with each other, with their deep ends outward, of a spring located partly in each recess with its ends resting in the respective deep ends of the recesses, whereby said spring forces the piston parts in opposite directions both laterally and longitudinally, substantially as described.

2. In a compound rotary engine, having a pair of piston-chambers, a pair of valve-chambers and ports leading from the valve-chambers to the piston-chambers, the combination, with a pair of conical valves located in the valve-chambers, each valve having a partition, of a nipple connecting the valves below the partitions and means for rotating one of the valves whereby the nipple connection will cause the rotation of the other valve, substantially as set forth.

In testimony whereof I affix my signature in presence of two witnesses.

WILHELM AAB.

Witnesses:
JOHN LIND,
HENRY N. JOMSEN.